United States Patent
Martin et al.

(10) Patent No.: US 10,454,480 B2
(45) Date of Patent: Oct. 22, 2019

(54) EMBEDDED FPGA WITH MULTIPLE CONFIGURABLE FLEXIBLE LOGIC BLOCKS INSTANTIATED AND INTERCONNECTED BY ABUTMENT

(71) Applicant: Silicon Mobility, Valbonne/Sophia Antipolis (FR)

(72) Inventors: Grégorie Martin, Valbonne (FR); David Cavalli, Cagnes sur Mer (FR); Fabian Firmin, Nice (FR)

(73) Assignee: Silicon Mobility, Valbonne/Sophia Antipolis (FR)

( * ) Notice: Subject to any disclaimer, the term of this patent is extended or adjusted under 35 U.S.C. 154(b) by 0 days.

(21) Appl. No.: 16/175,671

(22) Filed: Oct. 30, 2018

(65) Prior Publication Data

US 2019/0131970 A1   May 2, 2019

Related U.S. Application Data

(63) Continuation-in-part of application No. 15/227,108, filed on Aug. 3, 2016, now Pat. No. 10,116,311.

(51) Int. Cl.
*H03K 19/0175*   (2006.01)
*H03K 19/177*   (2006.01)
*G06F 17/50*   (2006.01)

(52) U.S. Cl.
CPC . *H03K 19/017581* (2013.01); *G06F 17/5031* (2013.01); *G06F 17/5054* (2013.01);
(Continued)

(58) Field of Classification Search
None
See application file for complete search history.

(56) References Cited

U.S. PATENT DOCUMENTS 5,155,389 A * 10/1992 Furtek ............... G06F 17/5054
326/39
6,014,509 A   1/2000 Furtek et al.
(Continued)

FOREIGN PATENT DOCUMENTS

WO   WO-2008/041978   4/2008

OTHER PUBLICATIONS

Hauck, Scott, "The Roles of FPGA's in Reprogrammable Systems", Proceedings of the IEEE, vol. 86, No. 4, Apr. 1998, pp. 615-638.

*Primary Examiner* — Jany Richardson
(74) *Attorney, Agent, or Firm* — Womble Bond Dickinson (US) LLP

(57) ABSTRACT

An embedded field programmable gate array (EFPGA) includes several abuttable configurable logic blocks (ACLBs). Each ACLB is interconnected with adjacent ACLBs by abutment of an out pin to an adjacent in pin. Each ACLB may be an instance of multiple programmable functional blocks. Each ACLB may be a particular ACLB type that provides a particular instance of the multiple programmable functional blocks. The EFPGA may include several ACLBs of the same type. An ACLB of one type may be adjacent an ACLB of a different type. The ACLBs may form sets that are configured identically. The sets may be interconnected by abutment of an out pin to an adjacent in pin. The EFPGA may be part of a system-on-chip integrated circuit. A method for designing an EFPGA with ACLBs that are interconnected by abutment is disclosed.

17 Claims, 18 Drawing Sheets

(52) U.S. Cl.
CPC ... *G06F 17/5072* (2013.01); *H03K 19/17704* (2013.01); *H03K 19/17724* (2013.01)

(56) References Cited

U.S. PATENT DOCUMENTS

| | | | |
|---|---|---|---|
| 6,191,613 B1 | 2/2001 | Schultz et al. | |
| 6,502,050 B1 | 12/2002 | Chan | |
| 6,675,306 B1 | 1/2004 | Baxter | |
| 6,766,505 B1 | 7/2004 | Rangan et al. | |
| 6,825,690 B1 | 11/2004 | Kundu | |
| 6,981,167 B2 | 12/2005 | Johnson et al. | |
| 7,049,846 B1 | 5/2006 | Kundu | |
| 7,107,560 B1 * | 9/2006 | New | G06F 17/5054 716/121 |
| 7,159,204 B2 | 1/2007 | Iotov et al. | |
| 7,203,842 B2 | 4/2007 | Kean | |
| 7,373,567 B2 | 5/2008 | Cohn et al. | |
| 7,375,553 B1 | 5/2008 | Kundu | |
| 7,545,168 B2 | 6/2009 | Kundu | |
| 7,644,327 B2 | 1/2010 | Cohn et al. | |
| 8,345,703 B2 | 1/2013 | Heinkel et al. | |
| 9,048,827 B2 | 6/2015 | Tahiri et al. | |
| 9,077,339 B2 | 7/2015 | Tahiri et al. | |
| 9,252,778 B2 | 2/2016 | Tahiri et al. | |
| 2003/0128050 A1 | 7/2003 | Schultz | |
| 2003/0212940 A1 | 11/2003 | Wong | |
| 2004/0153923 A1 | 8/2004 | Goel et al. | |
| 2005/0040850 A1 | 2/2005 | Schultz et al. | |
| 2005/0084076 A1 | 4/2005 | Dhir et al. | |
| 2005/0097432 A1 | 5/2005 | Obuchi et al. | |
| 2005/0121698 A1 | 6/2005 | Reynolds et al. | |
| 2005/0278588 A1 | 12/2005 | Cohn et al. | |
| 2006/0006904 A1 | 1/2006 | Marui | |
| 2007/0247189 A1 | 10/2007 | Phil et al. | |
| 2008/0104557 A1 | 5/2008 | Gopalakrishnan et al. | |
| 2008/0163016 A1 | 7/2008 | Cohn et al. | |
| 2011/0255441 A1 | 10/2011 | Heinkel et al. | |
| 2012/0213268 A1 | 8/2012 | Liu et al. | |
| 2014/0111247 A1 | 4/2014 | Hutton | |
| 2014/0325460 A1 | 10/2014 | Ferguson et al. | |
| 2015/0091613 A1 | 4/2015 | Tahiri et al. | |
| 2015/0091614 A1 | 4/2015 | Tahiri et al. | |
| 2015/0303926 A1 | 10/2015 | Tahiri et al. | |

* cited by examiner

Figure 13AFigure 13B

Regular Matrix

Top level pattern

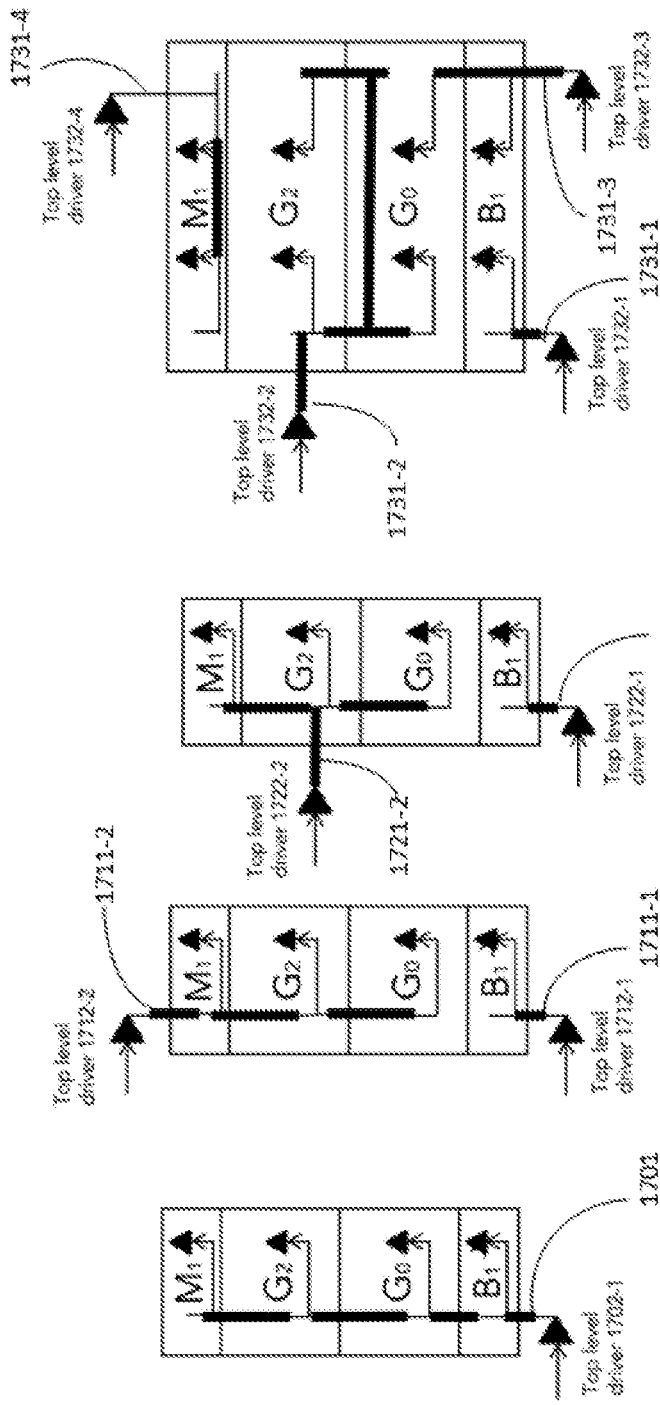

EMBEDDED FPGA WITH MULTIPLE CONFIGURABLE FLEXIBLE LOGIC BLOCKS INSTANTIATED AND INTERCONNECTED BY ABUTMENT

RELATED APPLICATIONS

This application is a continuation-in-part of U.S. patent application Ser. No. 15/227,108 filed Aug. 3, 2016 and entitled "Embedded FPGA with multiple Configurable Flexible Logic Blocks Instantiated and Interconnected by Abutment", which is related to U.S. Pat. No. 9,048,827, entitled "Flexible Logic Unit", issued on Jun. 2, 2015 and U.S. Pat. No. 9,077,339, entitled "Robust Flexible Logic Unit", issued on Jul. 7, 2015, the disclosures of which are incorporated herein by reference in their entirety.

BACKGROUND

Field

Embodiments of the invention relate to methods of implementing an embedded field programmable gate array (EFPGA) within an integrated circuit (IC) or a System-on-Chip (SOC); and specifically for optimizing the space used on the SOC by use of abuttable configurable logic blocks (ACLBs) that are interconnected by abutment to adjacent ACLBs in the EFPGA.

Background

Integrated circuits (ICs) have found applications in all areas of human life, like from home to health and communications to transportation. The ICs have also become larger with a plurality of circuits implemented in a System-on-Chip (SOC) implementation. As these ICs have become larger in size there is a definite need for the capability to configure them to handle a plurality of applications. This capability is provided to the SOC by including reconfigurable circuits in the form of an embedded field programmable gate array (EFPGA) on the SOC. Further EFPGAs can be used to replace defective circuit elements on a SOC to improve the yield and hence reduce the cost of the SOC in applications as well as to off load computations from the on chip central processing unit (CPU) to enable it to perform other essential functions.

A field programmable gate array (FPGA) is a general-purpose, multi-level programmable logic device that is customized in the package by the end users. FPGAs are composed of blocks of logic connected with programmable interconnect. An embedded field programmable gate array (EFPGA) is an FPGA that is included as part of an IC that also includes specialized, non-programmable circuits that can be connected to the EFPGA to provide an IC that retains some end user programmability while providing capabilities that are difficult to achieve with an FPGA.

FIG. 1 shows an exemplary representation 100 of a typical prior art embedded field programmable gate array (EFPGA) and FIG. 2 shows an exemplary representation 200 of a typical stand-alone implementation of a prior art FPGA. Typical EFPGAs 100 are implemented using configurable logic blocks (CLBs) 101 that are programmable with programmable interconnect elements 104 associated with each CLB that can be used to connect the inputs and outputs of the CLBs 101, to other CLBs 101, on the FPGA 100, using connection wires 102 and 103, running in pre-defined routing channels on the FPGA 100. These routing channels 102 and 103, used for interconnection between the CLBs 101, occupy a substantial percentage of the area of the FPGA 100 and hence on the SOC where the EFPGA 100 is embedded. In the case of the prior art stand-alone FPGA, 200, CLBs 101 are interconnected via switchable interconnection 203 to wires running in wiring channels 201 to connect to other CLBs 101. These wires in the wiring channels 201, in addition to interconnecting the CLBs 101 connect the inputs and outputs of the FPGA to input/out (I/O) pads 202. It has been shown that programming of the FPGA 100 of this nature is difficult and time consuming and the routing channels used for running a sufficiency of wires for interconnection consumes a substantial area on the FPGA.

The placement of the CLBs and interconnection is generally done when the FPGA is being placed routed and programmed. As such the wire lengths, switch counts and associated delays are unknown till the place and route program is run and hence do not provide the designers the capability to simulate the delays of the circuit prior to implementation. This is a problem in many large SOCs where accurate timing simulation during design is a very helpful for fast design completion and to ensure correct operation of the designed product.

It would be desirable to provide an EFPGA that allows a multiplicity of programmable CLBs to be designed to fit the design requirements that can be interconnected without interconnect wires running within dedicated routing channels, thereby reducing the area requirement on the SOC for embedding the EFPGA. It is also desirable to provide the capability to reduce the time for implementation of an EFPGA using computerized automation and the capability for timing simulation.

SUMMARY

Implementing large functional circuits with multiple functional blocks (FBs) has become common with integrated circuits (ICs) that are System-on-Chip (SOC) implementations. Embedded field programmable arrays (EFPGAs) included as part of the SOC provide functional programmability for circuit re-configuration, design/manufacturing error repair, etc., for the SOC implementation. Most of the present day EFPGAs comprise a single type of configurable logic block (CLB) that is programmable and arrayed within the embedded space. During design implementation these CLBs are programmed and interconnected to provide the needed functionality. The interconnection scheme typically require specialized programmable switches and interconnect channels within the embedded array space carrying interconnect wires to connect between the instantiated and functional CLBs of the EFPGA. The use of a single type of CLB and use of routing channels to complete the design creates major constraints for the EFPGA in terms of silicon area utilization and wire length related delay assessments. These connection channels of the EFPGA take up a comparably large percentage of the IC/SOC area used when EFPGAs are included and used for the design.

A new EFPGA implementation using multiple abuttable configurable logic blocks (ACLBs) that are themselves instantiable modules of programmable FBs, that can be abutted to provide connectivity, is described. By using a hierarchical implementation methodology, a complex and fully scalable EFPGA design without resource issues and high performance is enabled. These multiple ACLBs are made to interconnect by abutment using pin assignment and alignment features and pin placement capability available in current place and route routines. This provides full connectivity between the adjacent ACLBs of different types generating the EFPGA. No additional dedicated routing, except for clock and global controls are needed on the IC/SOC to interconnect these ACLBs forming the EFPGA, designed for specific functionalities, as all connectivity is achieved through abutment.

The new invention relates to implementing a multiplicity of pre-defined types of abuttable configurable logic blocks (ACLBs) that can be used as multiple instantiated functional logic (FL) modules, to meet the demands of a design and ensuring that they are hierarchically organized within the design flow to enable connectivity requirements to only the neighboring ACLBs. Such an FPGA design flow which takes care of the control mechanisms and interconnects has not been proposed or implemented in the past. This type of abutted design of EFPGAs using the pre-designed set of ACLBs and hierarchical flow capability brings flexibility to the design while providing predictable performance by avoiding additional wire delays in the design. Timing performance, power consumption and matrix area of any EFPGA configuration can be automatically extracted based on this abutted design method. The elimination of routing channels and wires also reduces the wasted area on silicon.

As in a typical EFPGA design, the design of an EFPGA according to the invention uses multiple instantiations of a number of pre-defined types of ACLB implementations to complete the design. By having multiple pre-defined ACLB block master implementations in a library, it is possible to check out multiple design layout configurations using the available master ACLBs to optimize the design parameters.

As a first phase the basic design requirement is assessed for the types of pre-defined ACLBs that need to be used. Master sets of ACLBs are identified to be used to generate the EFPGA. Placements and abutments of the master ACLBs are then defined and pin placement done to ensure proper inter-connections between adjacent ACLBs by abutment. The chosen or designed master ACLBs with pin placement are characterized fully for functionality and timing. The master sets of ACLBs are then replicated and placed in an array format with fully abutted neighbors. A dedicated global clock and control interconnection layer on top of the laid out EFPGA is used to distribute the clock and control inputs and ensure that they are synchronized within the EFPGA layout to complete the design and layout of the EFPGA. Having such a dedicated interconnect layer makes the clock and global control circuits scalable to fit the layout of the EFPGA. Interconnections to and from the EFPGA are also defined to the I/O pads and to other fixed embedded instantiated blocks, such as memories and embedded processors, that are required for the IC design to complete the IC layout. Configuration of the EFPGA to complete the functional IC design is performed in a sequential manner based on the register-transfer level (RTL) design flow of the design.

Other features and advantages of the present invention will be apparent from the accompanying drawings and from the detailed description that follows below.

BRIEF DESCRIPTION OF THE DRAWINGS

The invention may best be understood by referring to the following description and accompanying drawings that are used to illustrate embodiments of the invention by way of example and not limitation. In the drawings, in which like reference numerals indicate similar elements:

FIGS. 13A-13B show an exemplary ACLB with pre-wired long-pin connections according to one embodiment.

FIG. 17A shows a vertical long-pin connection with repeaters in each of the ACLBs according to one embodiment.

FIG. 17B shows an ACLB implementation using two top-level drivers according to one embodiment.

FIG. 17C shows another ACLB implementation using two top-level drivers according to one embodiment.

FIG. 17D shows the improvement of using the vertical and horizontal long-pin connections in an ACLB implementation according to one embodiment.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

In the following description, reference is made to the accompanying drawings, which illustrate several embodiments of the present invention. It is understood that other embodiments may be utilized, and mechanical compositional, structural, electrical, and operational changes may be made without departing from the spirit and scope of the present disclosure. The following detailed description is not to be taken in a limiting sense, and the scope of the embodiments of the present invention is defined only by the claims of the issued patent.

The terminology used herein is for the purpose of describing particular embodiments only and is not intended to be limiting of the invention. Spatially relative terms, such as "beneath", "below", "lower", "above", "upper", and the like may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (e.g., rotated 90 degrees or at other orientations) and the spatially relative descriptors used herein interpreted accordingly.

As used herein, the singular forms "a", "an", and "the" are intended to include the plural forms as well, unless the context indicates otherwise. It will be further understood that the terms "comprises" and/or "comprising" specify the presence of stated features, steps, operations, elements, and/or components, but do not preclude the presence or addition of one or more other features, steps, operations, elements, components, and/or groups thereof.

The terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Figure 1:
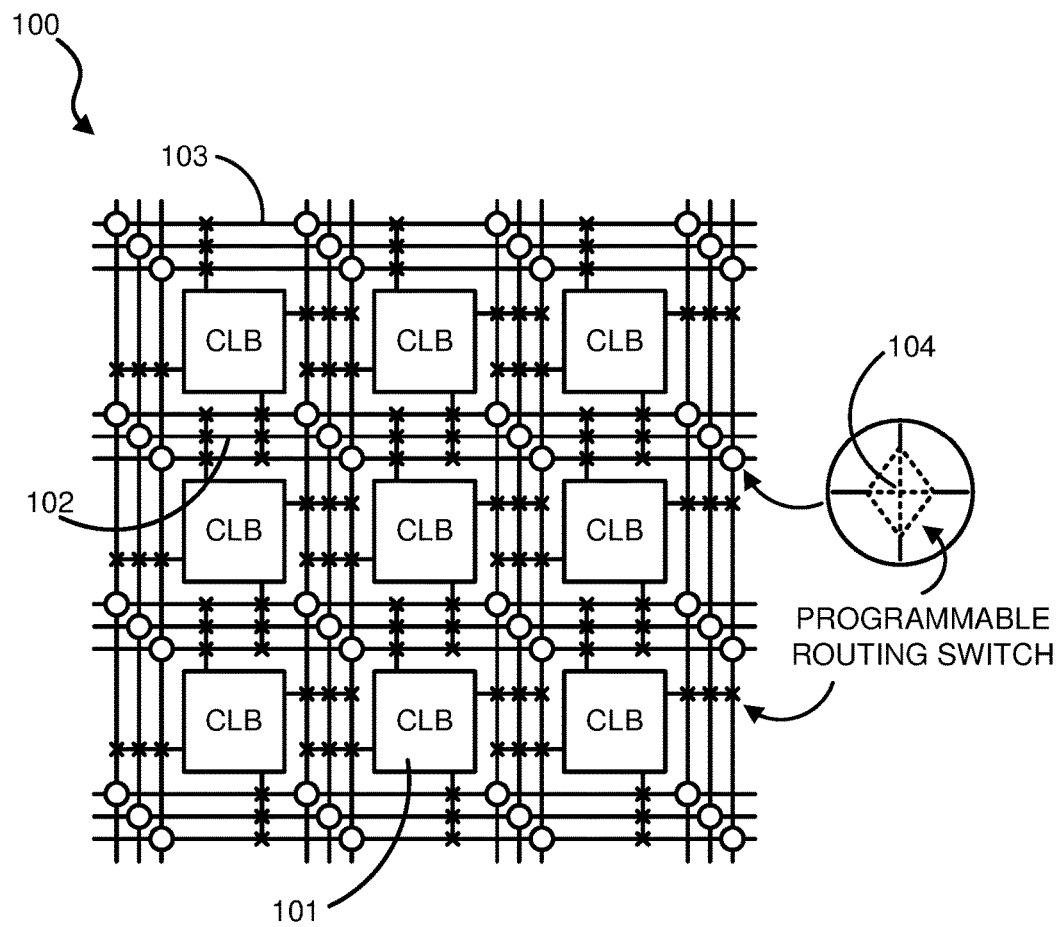
FIG. 1 is a block diagram of a prior art field programmable gate array (FPGA) showing the configurable logic blocks (CLBs) and interconnect resources.
Figure 2:
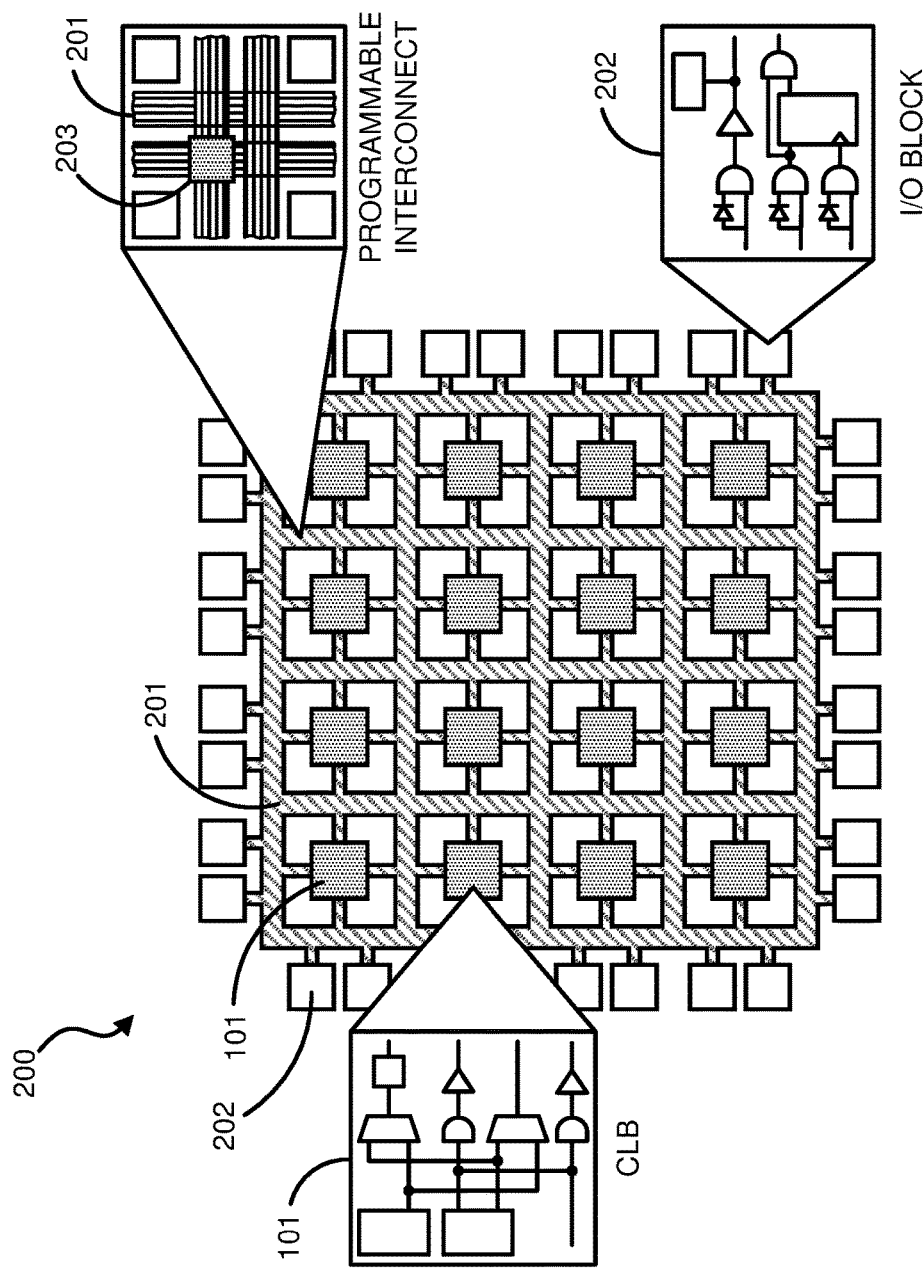
FIG. 2 is a block diagram of a prior art FPGA showing the input/output (I/O) pads and component connection capabilities.
Figure 3:
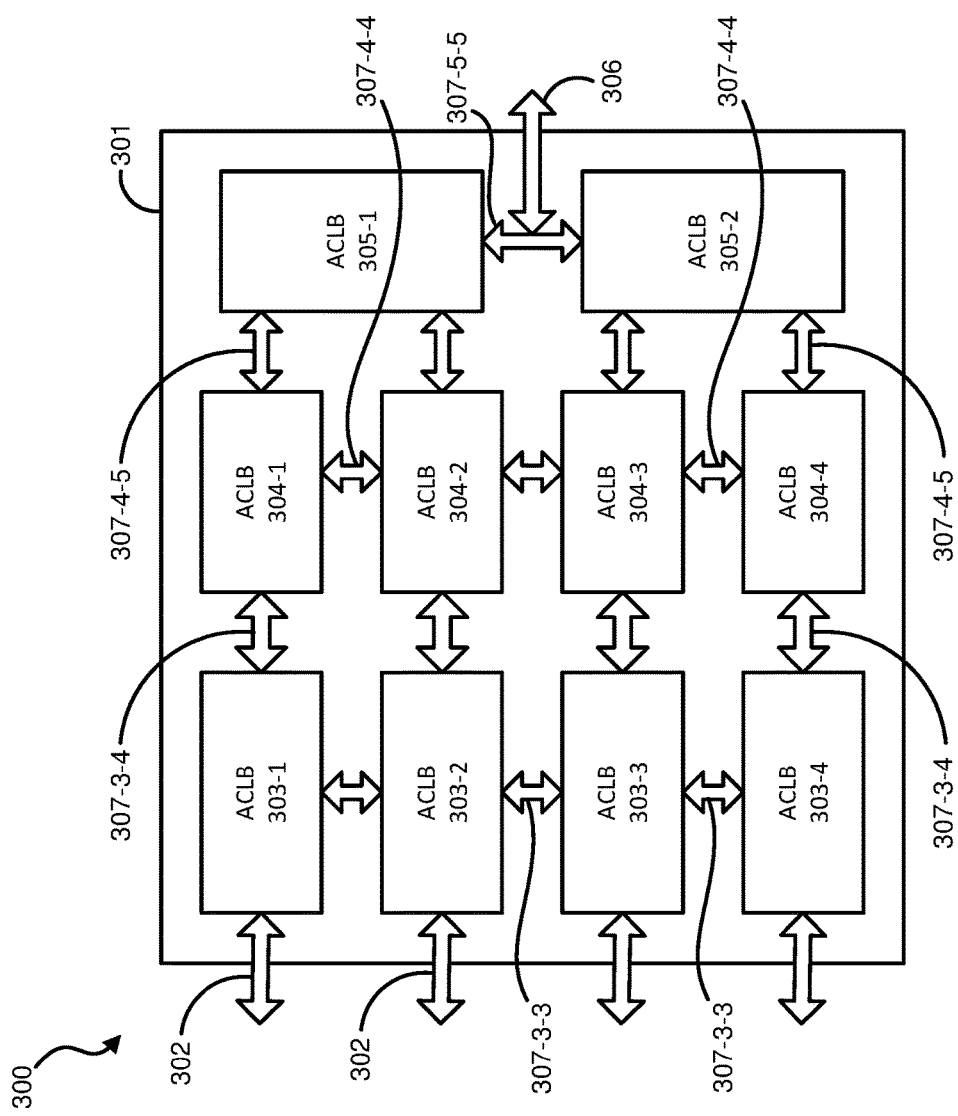
FIG. 3 is a block depiction of abutted connections between instantiated modules as per an embodiment of the invention.

FIG. 3 is an exemplary schematic diagram 300 of an implementation that embodies the disclosed invention. The embedded FPGA (EFPGA) schematic 301 comprises multiple predefined abuttable configurable logic blocks (ACLBs) 305-1, 304-1, 303-1 that enable the implementation of the circuit. The inputs to the EFPGA schematic 301 are provided via connections 302 to the ACLBs at the periphery of the EFPGA schematic 301. Similarly the output from the EFPGA schematic 301 is shown as a bus 306. The abutted connections are by appropriate pin placement at the ACLB edges based on the ACLBs being abutted.

The connections between similar ACLBs are designated 307-x-x, where x is a digit indicating the ACLB type. An abutted connection from a first ACLB of first type 303-2 to a second ACLB of the first type 303-3 is designated as 307-3-3. An abutted connection from a first ACLB of a second type 304-1 to a second ACLB of the second type 304-2 is designated as 307-4-4. An abutted connection from a first ACLB of a third type 305-1 to a second ACLB of the third type 305-2 is designated as 307-5-5.

The connections between dissimilar ACLBs are designated 307-x-y, where x and y are digits indicating the two connected block types. An abutted connection from a first ACLB of a first type 303-1 to a second ACLB of a second type 304-1 is designated as 307-3-4. An abutted connection from a first ACLB of a second type 304-1 to a second ACLB of a third type 305-1 is designated as 307-4-5 and so on.

Having a set of pre-designed ACLBs that can be abutted as shown in the EFPGA schematic 301, provides the needed flexibility to implement multiple functionality within the EFPGA.

Figure 4:
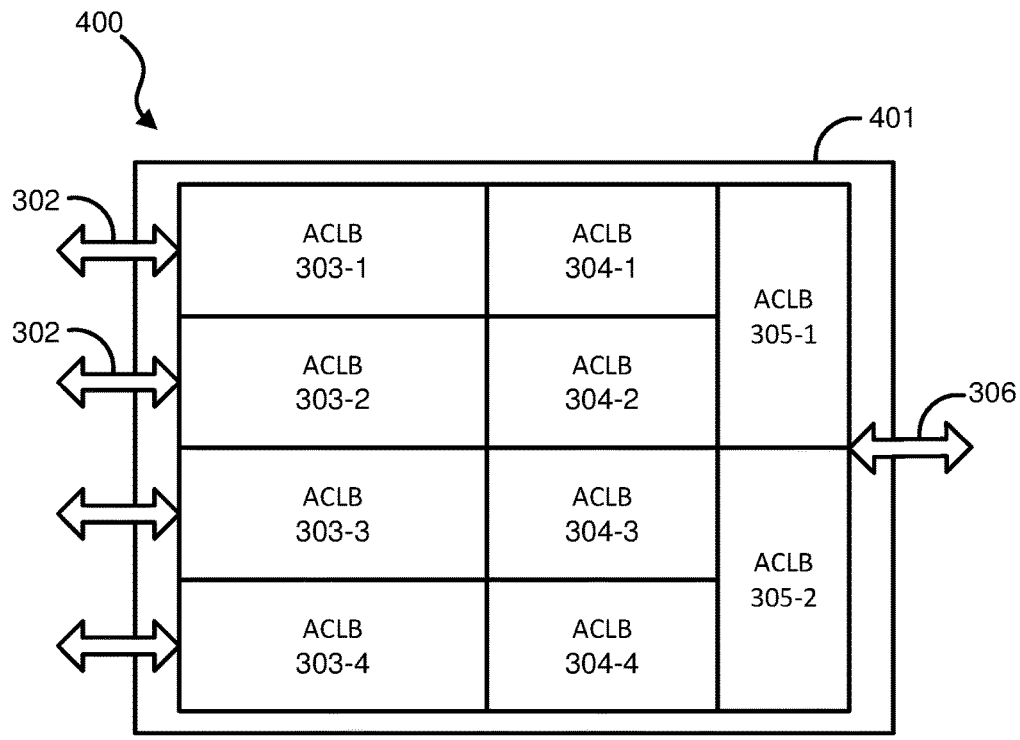
FIG. 4 is an exemplary block diagram of a fully abutted multiple flexible logic unit (FLU) block array architecture implementing an embedded field programmable gate array (EFPGA) in an embodiment of the invention.

FIG. 4 shows an abutted layout of an EFPGA 401 that corresponds to the exemplary schematic diagram 300 of FIG. 3. As shown, the four ACLBs of the first type 303-x are designated 303-1 to 303-4, the four 304-x ACLBs of the second type 304-x are designated 304-1 to 304-4 and the two 305-x ACLBs of the third type 305-x are designated 305-1 and 305-2. It has been found that in most EFPGA designs arraying similar ACLBs in columns as far as possible provides the most efficient and area effective layout.

In order to efficiently define an array of the different types of ACLBs, a set of master ACLBs is initially defined based on the design requirements. In the implementation shown, these are the 303 master ACLBs, the 304 master ACLBs, and the 305 master ACLBs. The array location of these ACLBs is then defined. Pin placement decisions are made for abutment of these ACLBs such that the arraying can be efficiently implemented.

Figure 5:
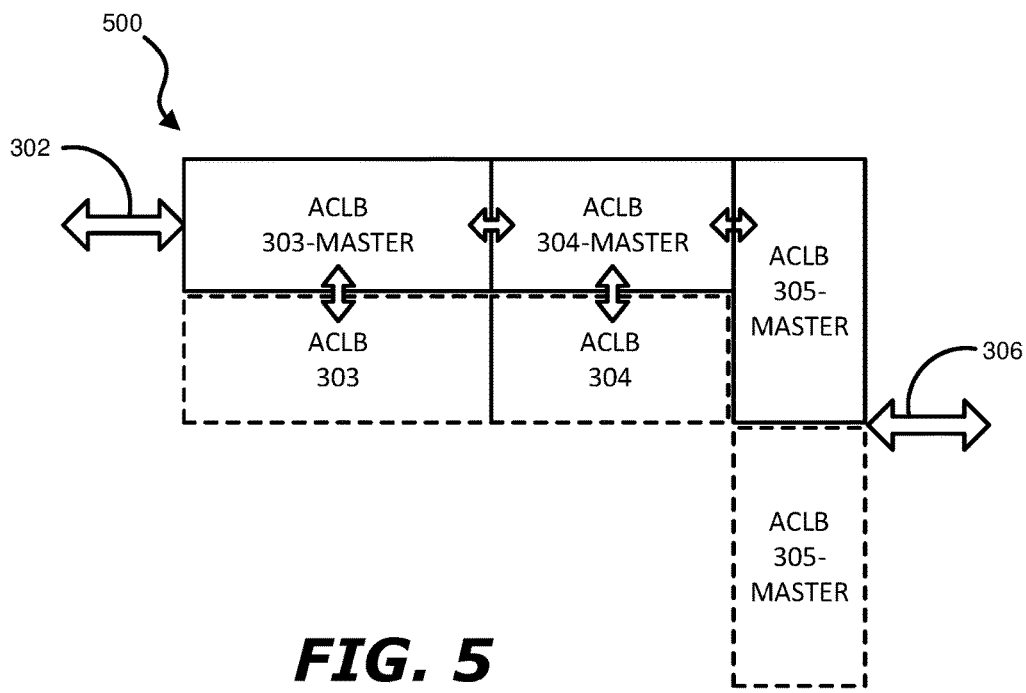
FIG. 5 is a block diagram defining a set of master block types and their abutment for use in implementing an EFPGA design in an embodiment of the invention.

FIG. 5 shows the abutment and arraying 500 of the chosen sets of master ACLBs for the design. Once the master sets of ACLBs are chosen and abutted array decisions are made, the number of ACLBs of each type to implement the design can be finalized and arrayed. The configuration of the pre-designed and laid out ACLBs to generate the EFPGA 401 is now done to complete the design using the EFPGA.

Since the master ACLBs are pre-defined it is possible to characterize the delay through each path within the ACLB. Since the connections are by abutment these delays are not modified by wire lengths used for connection, resulting in wiring delays, which in normal FPGAs remain unknown till the design is placed and routed and implemented. This deterministic feature of delay of the ACLBs of the design allow more accurate simulation of timing delays through the designed EFPGAs, during the design phase.

Figure 6A:
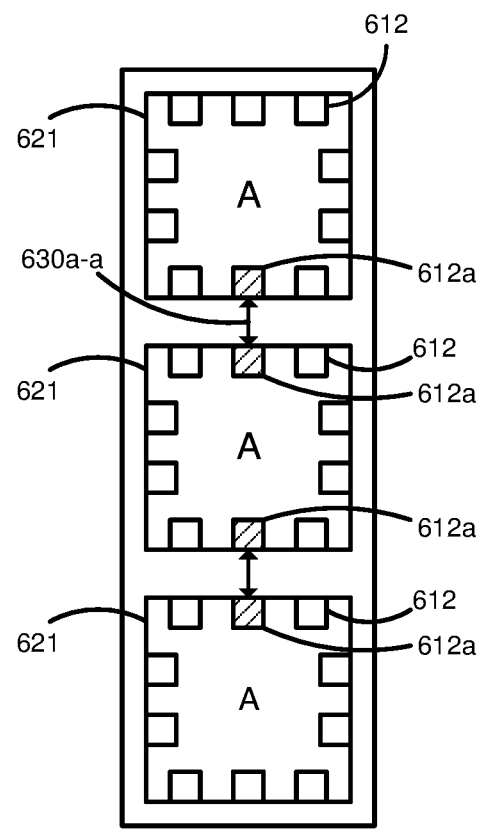
FIG. 6A shows a first exemplary representation of the use of pin placements based on neighboring block type to enable abutment of the blocks as per embodiments of the invention.
Figure 6B:
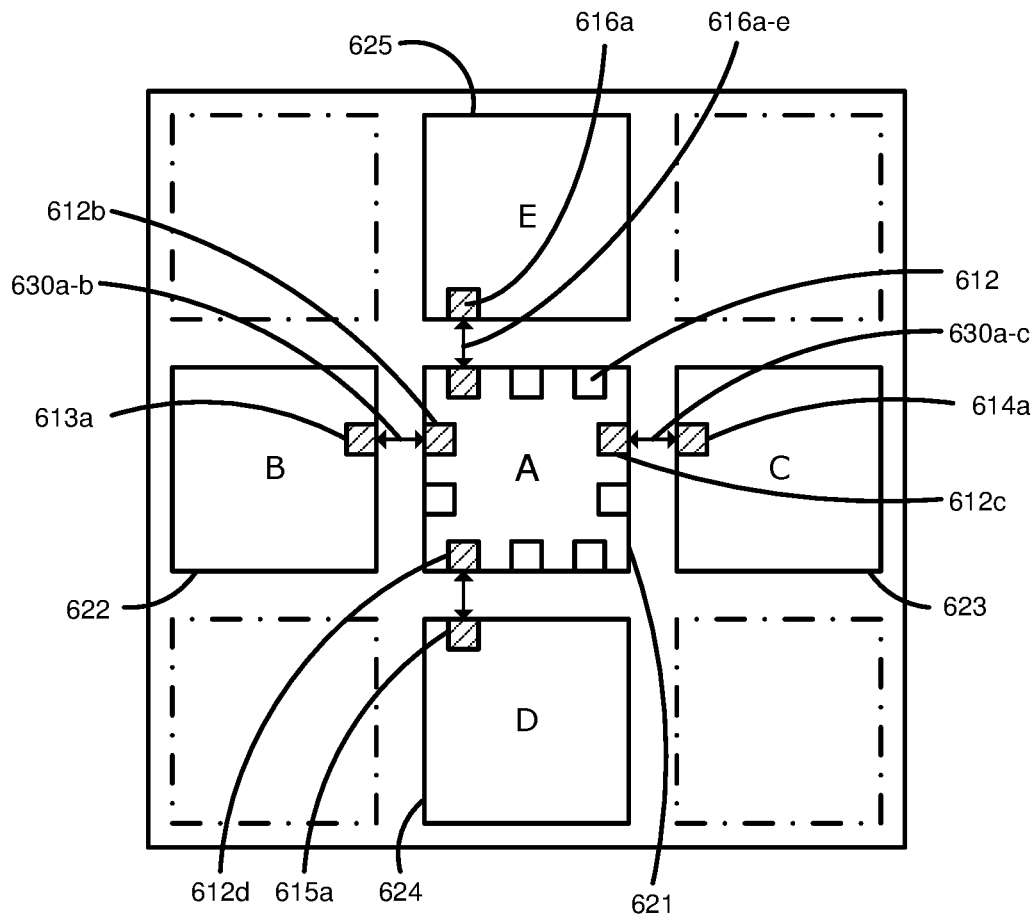
FIG. 6B shows a second exemplary representation of the use of pin placements based on neighboring block type to enable abutment of the blocks as per embodiments of the invention.
Figure 6C:
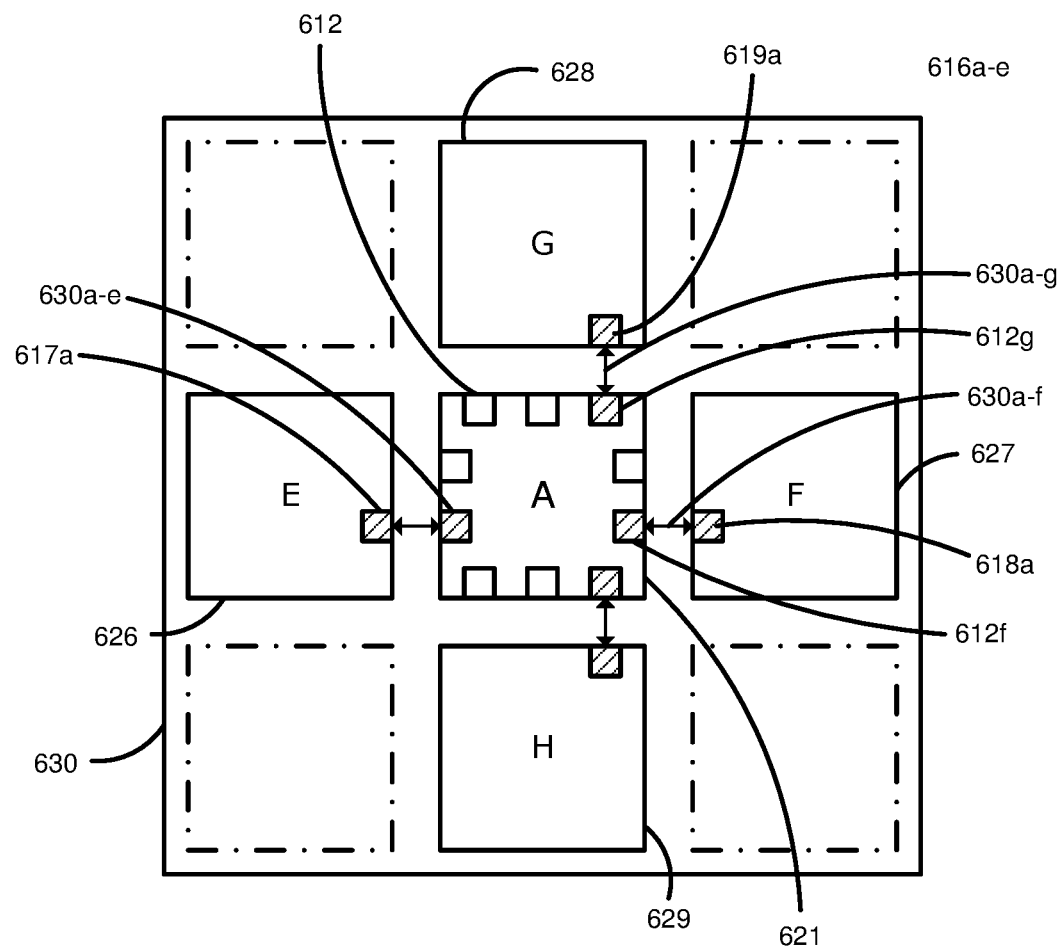
FIG. 6C shows a third exemplary representation of the use of pin placements based on neighboring block type to enable abutment of the blocks as per embodiments of the invention.

FIGS. 6A, 6B, and 6C are exemplary representations 600 of the use of pin placements based on neighboring ACLB type to enable abutment of the pre-designed ACLBs as per an embodiment of the invention. In one exemplary representation, the ACLB of type A is shown as having ten pin placement locations 612.

FIG. 6A shows an array of three ACLBs of type A 621, that are abutted. The abutting pin 612a placement in this case is identical for all three ACLBs 621. The connection 630 between two abutting pin locations 612a on two adjacent ACLBs of type A 621 is designated as 630-a-a.

FIG. 6B shows an array having ACLBs of type B 622, type C 623, type D 624, and type E 625, each adjacent to one of the four sides of the ACLB of type A 621. The pin placements on the ACLB of type A 621 are staggered and aligned with the pins placed on the adjacent ACLBs. For example, pins 612 placed at a first location 612b on the periphery of ACLBs of type A 621 will be aligned with pins placed at a second location 613a on the periphery of adjacent ACLBs of type B 622. The connection 630 made by the abutment is designated 630-a-b. Similarly, a pin 612d is located on the periphery of the ACLB of type A 621 and a pin 615a located on the periphery of an adjacent ACLB of type D 624 such that an abutted connection 630-*a*-*d* can be made between the two ACLBs.

FIG. 6C shows an array having ACLBs of type E 626, type F 627, type G 628, and type H 629, each adjacent to one of the four sides of the ACLB of type A 621. This array shows similar placement of pins on the periphery of adjacent ACLBs with connection established by abutment as described above. For example, the pin placed on the periphery of the ACLB of type G 628 at location 619*a* and the pin placed on the periphery of the ACLB of type A 621 at location 612*g* enable an abutted connection 630-*a*-*g* between these two adjacent but different types of pre-defined ACLBs.

Figure 7:
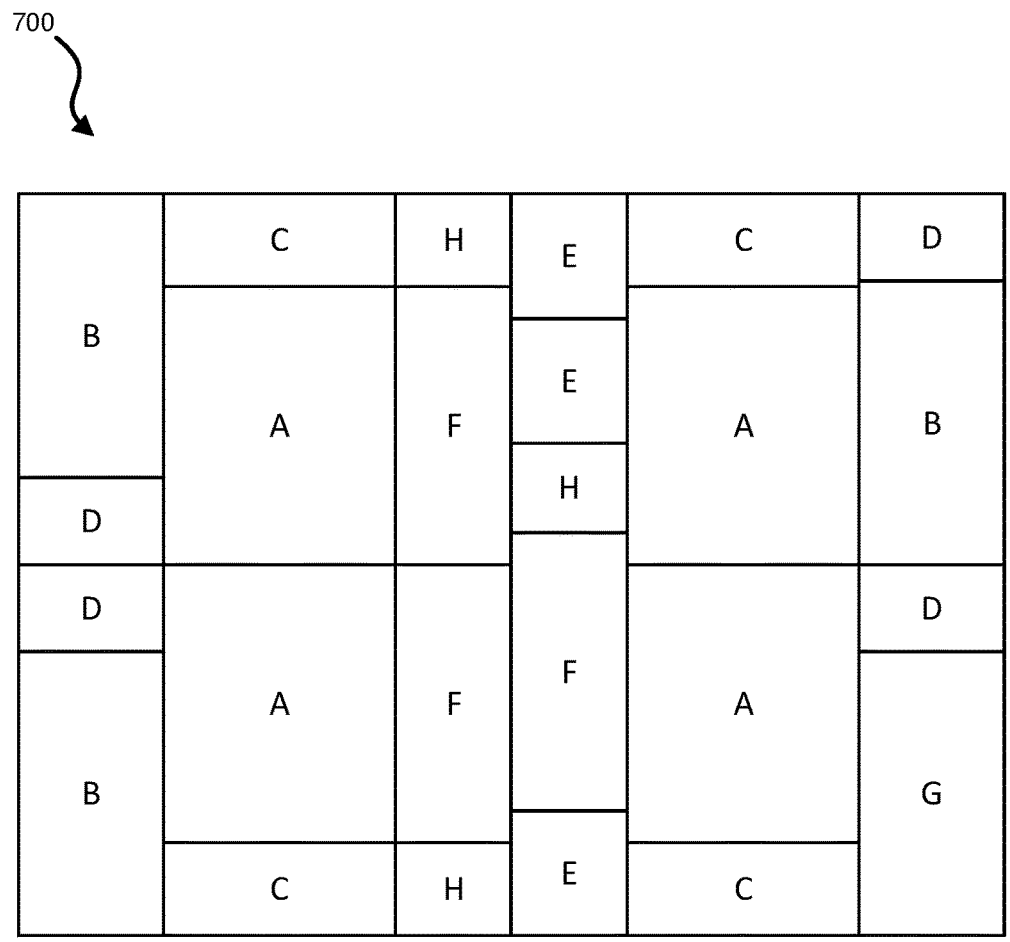
FIG. 7 shows an exemplary implementation of a sample design of an EFPGA as per an embodiment of the invention.

FIG. 7 shows an exemplary implementation of a sample design of an EFPGA 700 using the abutted sets of master ACLBs of types A through H 621-628 that have the right pin placements for making connections between adjacent logic blocks by abutment. Such a layout of an EFPGA 700 may be used to define and check the constraints of the EFPGA layout and programming when using the multiple types of pre-defined ACLBs.

Figure 8:
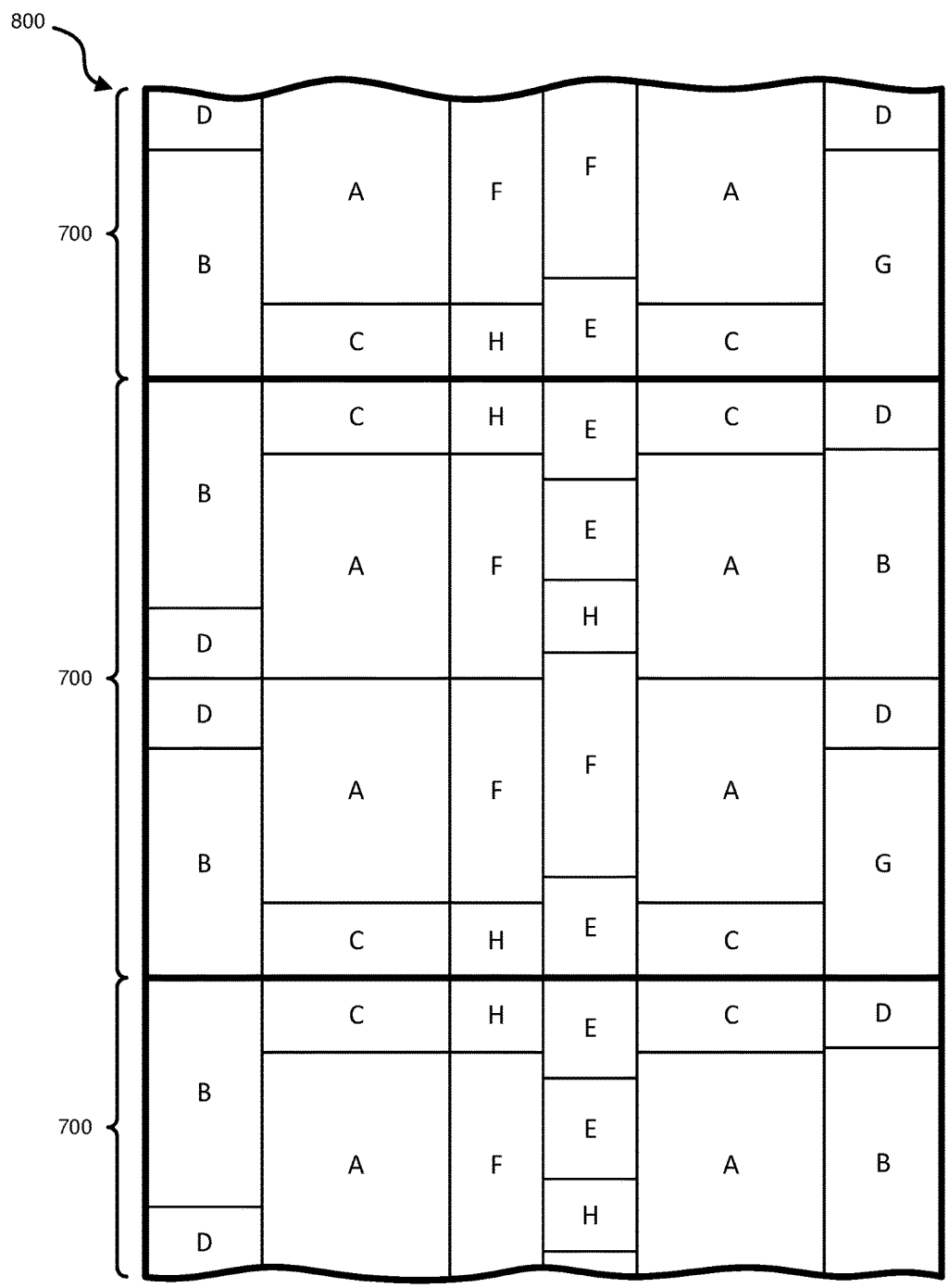
FIG. 8 shows an exemplary EFPGA implemented with full abutment of cells as per an embodiment of the invention.

Once the constraints are understood, a full design and layout of the EFPGA 800 as shown in FIG. 8 can be implemented using automated tools by replication and arraying of the selected blocks to achieve the functionality within the established constraints using the abuttable ACLBs of types A through H 621-628. This will enable faster turn-around of the design and reduce the time to market. It will also reduce the cost of circuit implementation for the customers by enabling automation.

Figure 9:
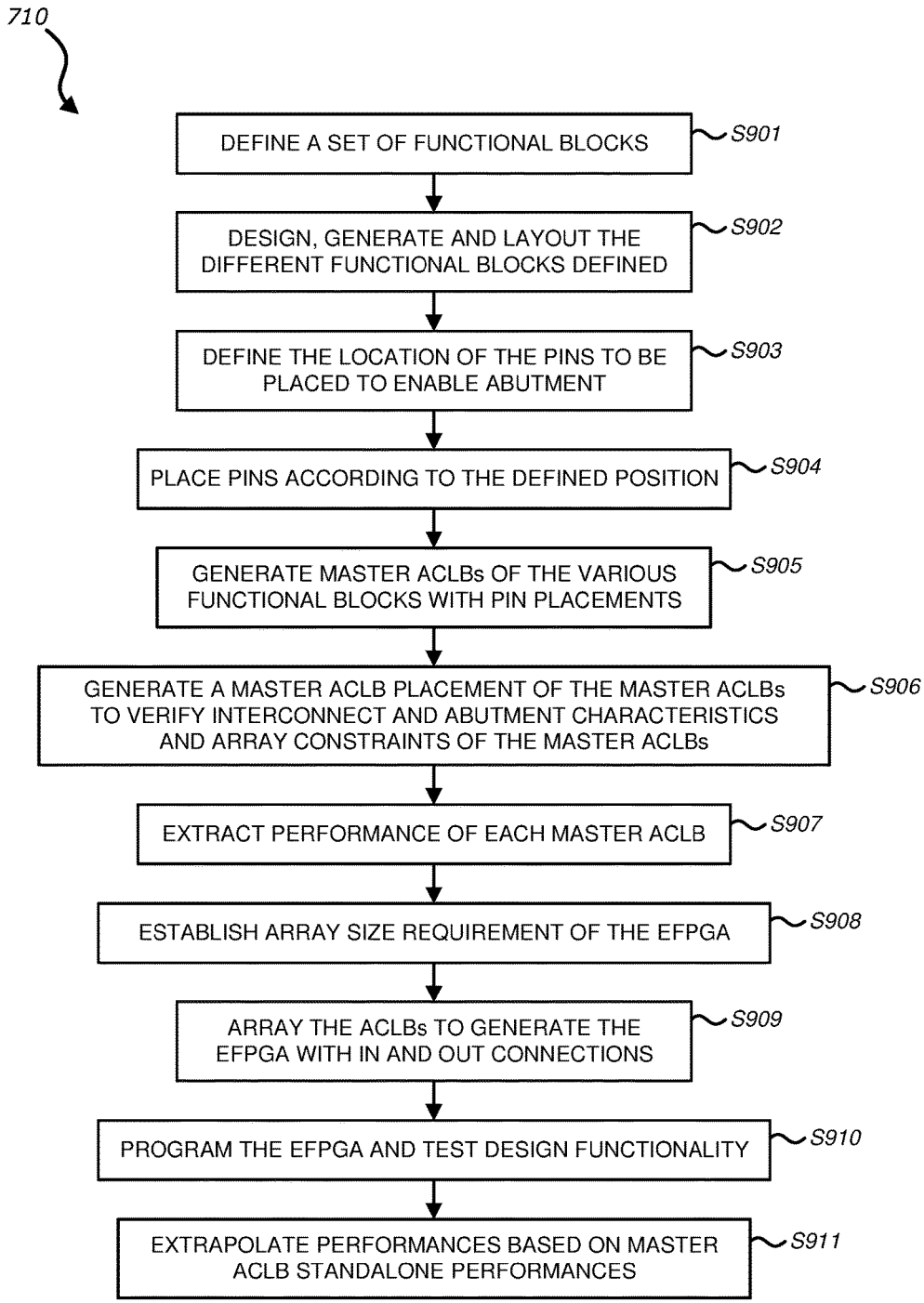
FIG. 9 is an exemplary flow chart of the abuttable EFPGA implementation as per an embodiment of the invention.

FIG. 9 is an exemplary flow chart 900 for designing an abuttable EFPGA by the following method:

Define a set of functional blocks (FBs) based on the design requirements of the system. S901.

The defined FBs are designed and a compact layout for the blocks is established with predefined pin layout locations. S902.

Pin placements are established for the FBs within the pre-defined locations based on the need for abutment of the blocks with neighboring blocks. S903.

Place pins as defined for abutment. S904.

For the designed and laid out FBs with the pin placement, EFPGAs are identified to generate a set of master ACLBs for instantiation, abutment and verification. S905.

Generate an abutted selected pre-defined ACLB placement layout of the master ACLBs to ensure that the constraints for abutment and interconnection are met. S906.

Extract performances of the master ACLB layout to ensure that the needs of the array can be met. S907

Establish the array size requirement of the EFPGA from the original system design. S908.

Array the ACLBs using abutment to generate the EFPGA needed for the system design with the necessary in and out connections. S909.

Place the FBs and program the EFPGAs as needed for the design being implemented, and do functional verification tests, thereby completing the design. S910.

Extrapolate performances based on master ACLB standalone performances and verify. S911.

Figure 10:
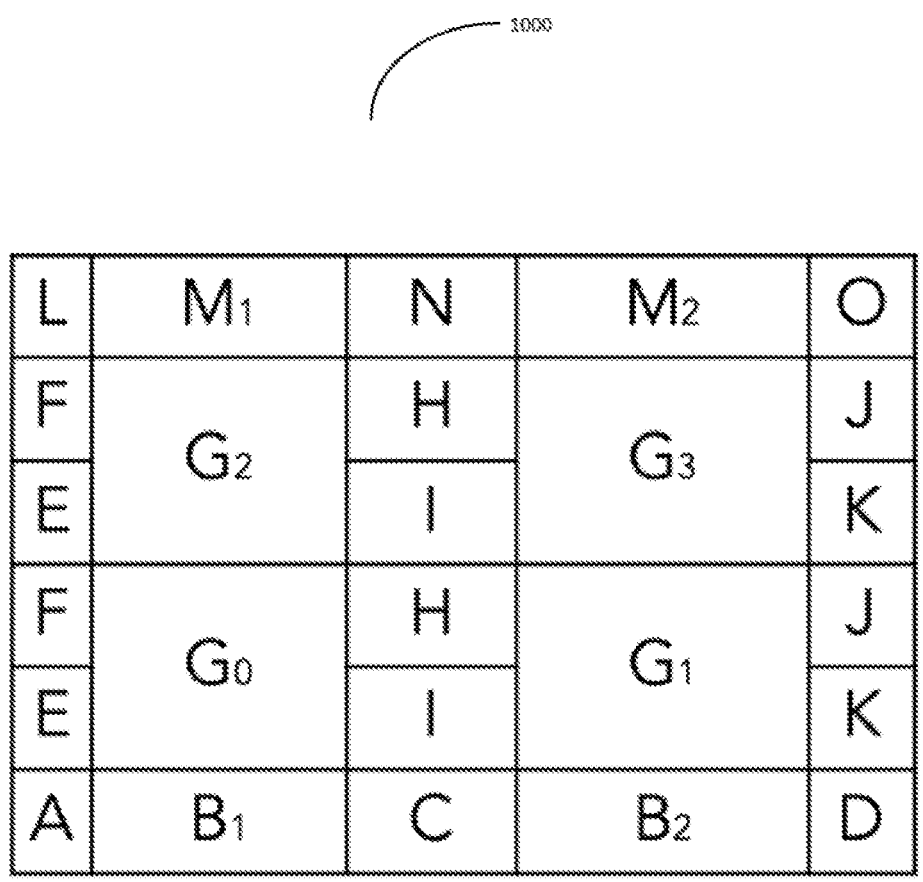
FIG. 10 shows another exemplary implementation of the abutted ACLB array according to one embodiment.

FIG. 10 shows another exemplary implementation of the abutted ACLB array 1000. The above implementations, though they solve problems of flexibility and interconnection of the replicated and abutted and interconnected ACLBs to make large arrays, still have to provide global signal routing to the ACLBs and require improvement in timing and other global signal connections to these ACLBs. This is especially true as the replicated ACLBs that internally have same device layout and routing has the interconnect pin positioning configurations based on neighboring ACLBs and hence are not all the same when considered with the connectivity. For example, considering FIG. 10, the ACLBs designated G0, G1, G2 and G3 are internally similar but are different as their interconnection pin placements are different. The G0 ACLB having pins placed to connect the "G0" ACLB to ACLBs "F" and "E" on left side and ACLBs "H" an "I" on the right side whereas the second ACLB "G1" has ACLBs "H" and "I" on the left side and ACLB "J" and "K" on the right side.

This differing interconnect scheme of the array creates limitations regarding balancing of the common global signals such as clock, select, enable, reset etc. It is ideal if the skew between of these signals at the ACLBs, within one signal domain, are zero or very low for efficient and correct circuit operation. Typically these signals will be driven form outside the ACLBs by top level drivers that do not form part of the ACLB array.

Figure 10A:
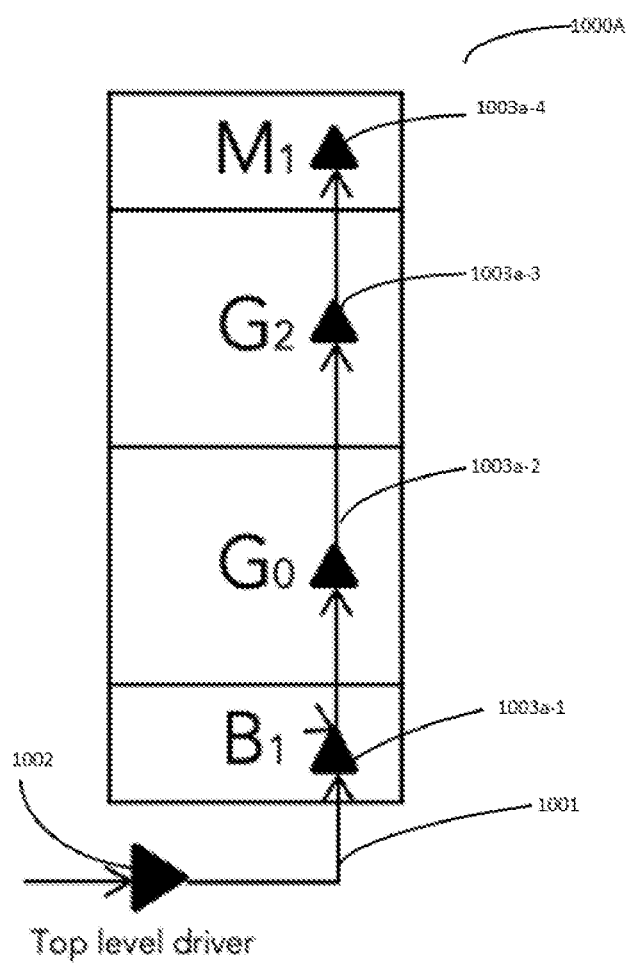
FIG. 10A shows an ACLB implementation with a top-level driver according to one embodiment.

Driving these signals using repeaters within the ACLBs generate skews as shown in the exemplary illustration 1000A shown in FIG. 10A where the specific signal line 1001 is driven vertically through the blocks by a top-level driver 1002 at the input pin. Within each ACLB a repeater 1003*a*-*n* is used (in the example shown 1003*a*-1 to 1003*a*-4) to drive the signal to the next interconnect pin and into the next ACLB. Each repeater used has a skew value and hence the final result is that the ACLBs as the signal is fed to them have differing skews. With the example shown in FIG. 10A the skew for:

the block B1 is equal to 1 drive, due to the repeater 1003*a*-1, the block G0 is equal to 2 drives, due to repeaters 1003*a*-1 and 1003*a*-2, the block G2 is equal to 3 drives, due to repeaters 1003*a*-1,1003*a*-2 and 1003*a*-3, and the block M1 is equal to 4 drives, due to repeaters 1003*a*-1,1003*a*-2,1003*a*-3 and 1003*a*-4.

The value of skew are additive and increases when the number of ACLBs increase and balancing between ACLBs is then linked with the size of the matrix which can make the performance of the array inefficient and slow.

Figure 11:
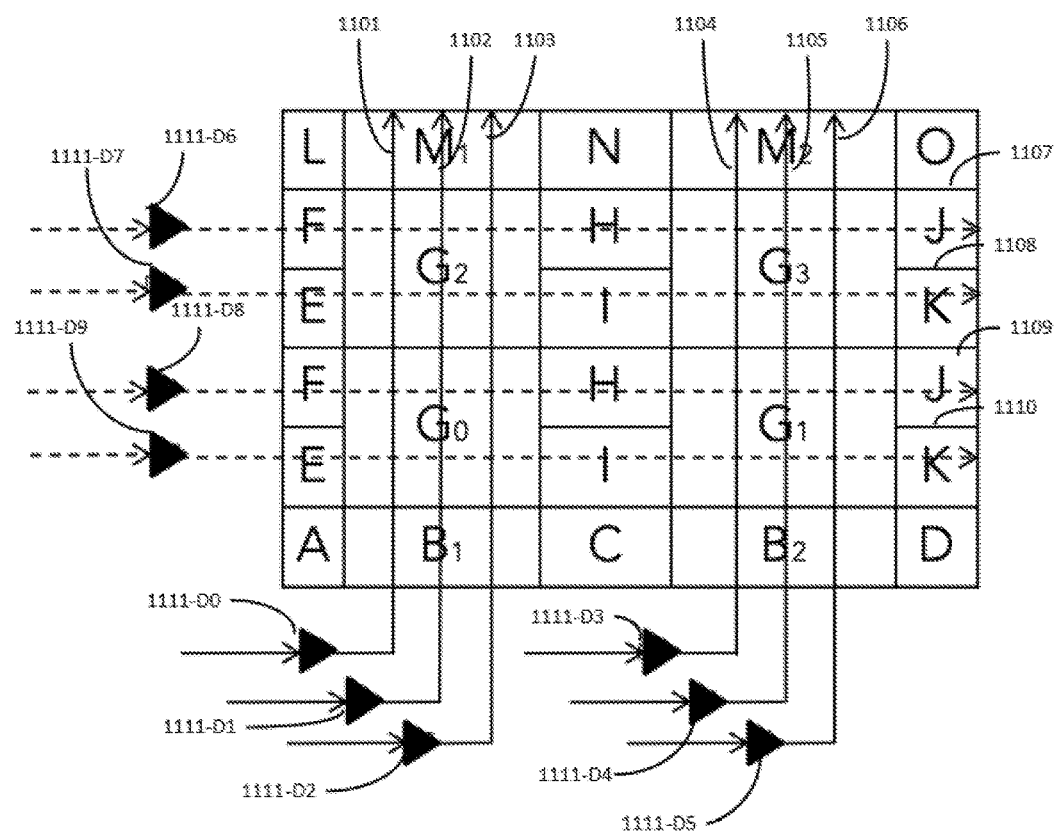
FIG. 11 shows an exemplary implementation of the ACLB array using long-pin connections according to one embodiment.
Figure 12:
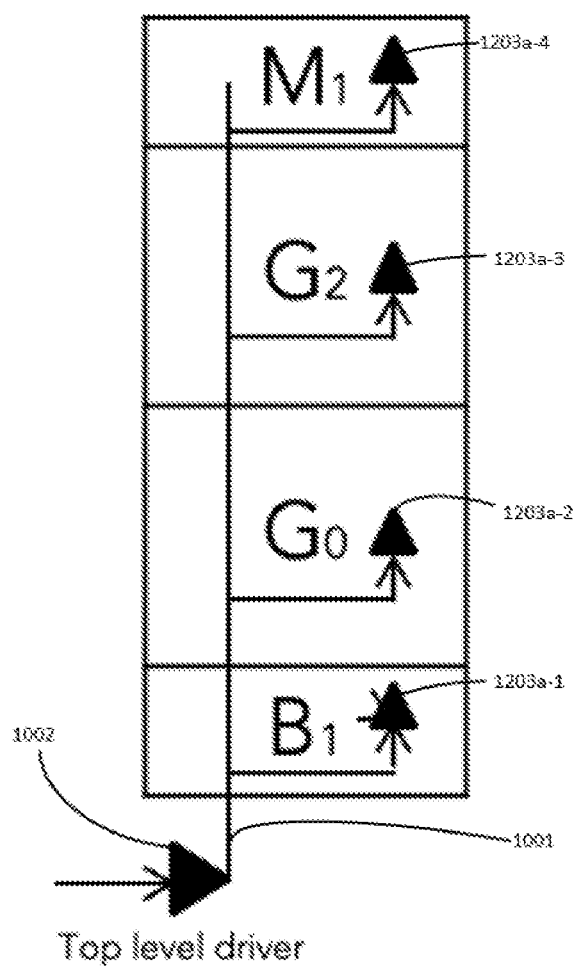
FIG. 12 shows an ACLB implementation using a single long-pin connection according to one embodiment.

One solution that has been proposed is the use of long-pins that extend from one side, for example bottom of the array to the top of the array, as shown in FIG. 11. Each long pin is driven by a top-level driver. The figure shows the vertical long pin connection 1101 to 1106 that are from bottom to top each driven by top-level driver 1111-D0 to D5 of the array and the horizontal long-pin connections 1107 to 1110 are driven by top-level drivers 1111-D6 to D9. Such a connection scheme would reduce the skew to a single skew for the ACLBs connected along any one of the long pin connections. With the example shown in FIG. 12 using a single long-pin connection 1001 with a top-level driver 1002 and individual parallel repeaters for each ACLB the skews for the ACLBs shown are the block B1 is equal to 1 drive, due to the repeater 1203*a*-1, the block G0 is equal to 1 drive, due to repeaters 1203*a*-2, the block G2 is equal to 1 drive, due to repeaters 1203*a*-3, and the block M1 is equal to 1 drive, due to repeaters 1203*a*-4.

Hence, by using the long-pin, the skews within the ACLBs can be equalized to a single drive to solve the problem. However, the top-level driver 1002 in such a case has to be made very large and strong to drive the long lines with large fan-out, if the quality of signals has to be maintained. Further this type of long-pin connections do not also allow flexibility of connection and routing at the ACLBs.

A solution that solves this problem is to use a new unitary layout for the ACLBs with long-pin connections pre-wired on the ACLBs, as shown in FIGS. 13A-13B. The ACLB wiring will have vertical long-pin connections 1301-1, 1301-2 and 1301-3 extending from nearly bottom to nearly top of each ACLB, and horizontal long-pin connections 1302-1, 1302-2, 1302-3, etc. extending from nearly left to nearly right of the ACLBs. These connections can be input or output long-pin connections. The use of ACLB-based wiring also allows each ACLB to have more than one connection within the ACLB if required.

Figure 14:
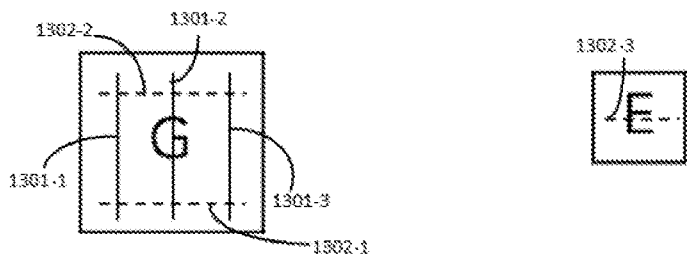
FIG. 14 shows an exemplary ACLB array having pre-wired long-pin connections according to one embodiment.

FIG. 14 shows an exemplary layout 1400 of an ACLB array, similar to the array shown in FIG. 10, but with the unitary ACLB implementation.

Figure 15:
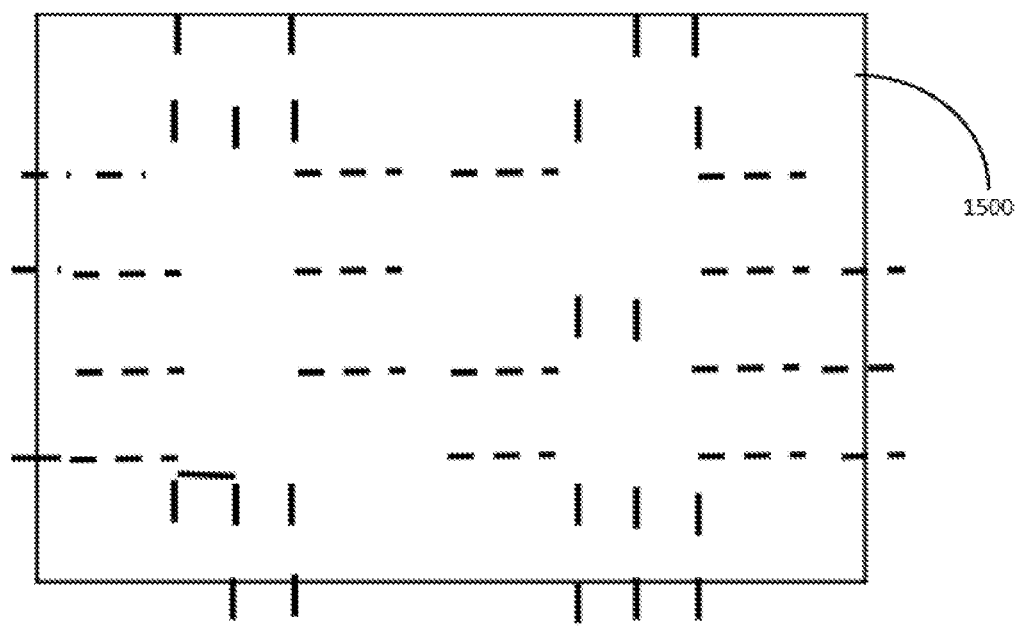
FIG. 15 shows an exemplary top-level routing pattern instantiated over an ACLB array according to one embodiment.
Figure 16:
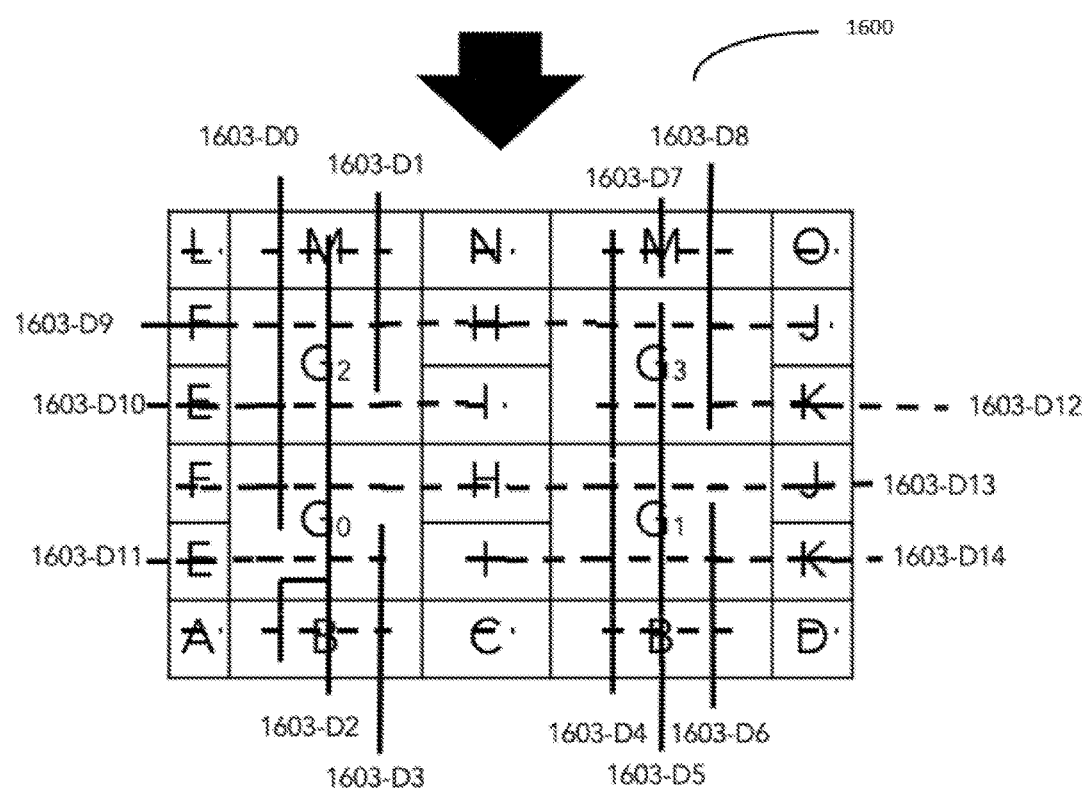
FIG. 16 shows an exemplary top-level routing pattern with vertical and horizontal long-pin connections according to one embodiment.

Referring to FIG. 14, ACLB array 1400 is physically similar to the original array 1000, except that it has the long-pin interconnect sections both horizontal and vertical already defined over the ACLBs of the array. Different top-level routing patterns can be arranged for the array to provide design flexibility and top-level drive requirements as well as flexibility for distribution of global signals within the ACLB array. Referring now to FIG. 15, a single top-level routing pattern 1500 instantiated over ACLB array 1400 is used to provide the flexible capabilities and connectivity. As shown in FIG. 16, the completed ACLB array with interconnection and top-level drivers 1603-D0 to 1603-14. As further shown in FIG. 16, the use of top-level routing for interconnection allows both horizontal and vertical long-pins to be used to reduce the previously described large drive requirements of the top-level drivers by reducing the fan-out and the line lengths. The top-level routing also enables the capability for multiple global signal domains, such as clock domains, to be used in the ACLB array as well as within a single ACLB. Examples of the flexibility in connectivity using this method are shown in FIGS. 17A, 17B, 17C and 17D.

FIG. 17A shows the previously described single long-pin use vertically with repeaters in each of the ACLBs and a single top-level driver 1702-1 driving a single long pin 1701. This provides a solution to the skew problem as discussed previously with respect to FIG. 12.

FIG. 17B shows an implementation using two top-level drivers 1712-1 and 1712-2 driving the long-pins. In FIG. 17B, driver 1712-1 drives a portion of long-pin 1711-1 into the ACLB "B1" from the bottom and the other top-level driver 1712-2 drives the other portion of the long-pin 1711-2 from the top covering ACLBs "M1", "G2" and "G0" to reduce the loading on the drivers.

FIG. 17C also shows two top level drivers 1722-1 and 1722-2 dividing up the driving of ACLBs "B1", "G0", "G2" and "M1". The driver 1722-1 drives the vertical long-pin 1721-1, while the second top-level driver drives the horizontal long-pin 1721-2, which connects to and drives the rest of the vertical long-pin covering ACLBs "G0", "G2", and "M1", to form a usable flexible connection between the horizontal and vertical long-pins to achieve the needed result.

FIG. 17D shows the flexibility improvement using the disclosed method. In FIG. 17D, the method allows mixed use of vertical long-pins such that top-level driver 1732-1 drives vertical long-pin 1731-1 from the bottom of the array, top-level driver 1732-3 drives long-pin 1731-3 also from the bottom of the array, and top-level driver 1732-4 drives long-pin 1731-4 from the top of the array, while top-level driver 1732-2 drives the long-pin 1731-2 horizontally from the left of the ACLB array. Further, this type of flexible driving allows establishment of signal domains, such as clock domains within the ACLB array and also within a single ACLB. The use of two or more separate top-level drivers enables independent drive signals into an ACLB, such as top-level drivers 1732-2 and 1732-3 driving into ACLB "G0" to enable the establishment of two signal clock domains within the ACLB "G0" if needed. This provides the designer flexibility that did not exist in the past with such ACLB use.

Even though exemplary implementations of the abuttable EFPGA using ACLBs are described they are not meant to be limiting the use of implementation of the technology and method shown. Other methods or features of implementations may be known or may become known to the practitioners of the art, and as such are all to be covered under the present invention disclosed.

What is claimed is:

1. An embedded field programmable gate array comprising:
    a plurality of abuttable configurable logic blocks (ACLBs), the plurality of ACLBs comprising a first set of ACLBs, each ACLB in the first set of ACLBs being selectively interconnected with another ACLB by a first pin extending from a first ACLB to a second ACLB, wherein the first and second ACLBs are included in the first set of ACLBs;
    wherein the first pin is driven by a top-level driver such that skews within the first set of ACLBs are equalized to a single skew.

2. The embedded field programmable gate array of claim 1, wherein
    the plurality of ACLBs further comprise a second set of ACLBs, at least one ACLB in the second set of ACLBs being selectively interconnected with at least one ACLB in the first set of ACLBs by a second pin extending from a third ACLB to a fourth ACLB, wherein the third and fourth ACLBs are included in the second set of ACLBs.

3. The embedded field programmable gate array of claim 2, wherein the second pin is horizontally disposed from the third ACLB to the fourth ACLB.

4. The embedded field programmable gate array of claim 2, wherein the first set of ACLBs and the second set of ACLBs have a common ACLB.

5. The embedded field programmable gate array of claim 2, wherein the second pin is driven by a top-level driver such that skews within the second set of ACLBs are equalized to a single skew.

6. The embedded field programmable gate array of claim 2, wherein each set of the first and second sets of ACLBs is of a different defined functional block.

7. The embedded field programmable gate array of claim 2, wherein a first top-level driver drives the first pin into at least one ACLB in the first set of ACLBs and a second top-level driver drives the second pin into one or more remaining ACLBs in the first set of ACLBs.

8. The embedded field programmable gate array of claim 1, wherein the first pin is vertically disposed from the first ACLB to the second ACLB.

9. The embedded field programmable gate array of claim 1, wherein the first pin is connected to a plurality of parallel repeaters in order to equalize the skews to the single skew, each of the plurality of parallel repeaters being disposed in a respective ACLB in the first set of ACLBs.

10. The embedded field programmable gate array of claim 1, wherein the first pin is driven by two top-level drivers from both ends of the first pin including one top-level driver driving a first portion of the first pin into at least one ACLB in the first set of ACLBs, and another top-level driver driving a second portion of the first pin into one or more remaining ACLBs in the first set of ACLBs.

11. An embedded field programmable gate array comprising:
  a plurality of abuttable configurable logic blocks (ACLBs), each of the plurality of ACLBs including pre-wired pin connections that form selective interconnections with one or more other ACLBs, wherein each of the pre-wired pin connections extends nearly from one end of the ACLB to nearly another end of the ACLB;
  wherein each of the pre-wired pin connections is driven by a respective top-level driver.

12. The embedded field programmable gate array of claim 11, wherein the pre-wired pin connections include pre-wired horizontal pin connections or pre-wired vertical pin connections or both.

13. The embedded field programmable gate array of claim 11, wherein a top-level routing pattern is instantiated over the plurality of ACLBs to selectively provide connectivity with the pre-wired pin connections of each of the plurality of ACLBs.

14. The embedded field programmable gate array of claim 13, wherein the top-level routing pattern is instantiated over the plurality of ACLBs to also reduce fan-out of the respective top-level driver.

15. The embedded field programmable gate array of claim 13, wherein the top-level routing pattern is instantiated over the plurality of ACLBs to also enable multiple signal domains in the plurality of ACLBs.

16. The embedded field programmable gate array of claim 13, wherein the top-level routing pattern is instantiated over the plurality of ACLBs to also enable multiple signal domains in each of the plurality of ACLBs.

17. The embedded field programmable gate array of claim 11, wherein the plurality of ACLBs comprises at least a plurality of sets of ACLBs, each set of ACLBs being of a different defined functional block.

* * * * *